July 27, 1965  V. C. KENNEDY  3,196,966
WEIGHING APPARATUS
Filed Jan. 13, 1964  2 Sheets-Sheet 1
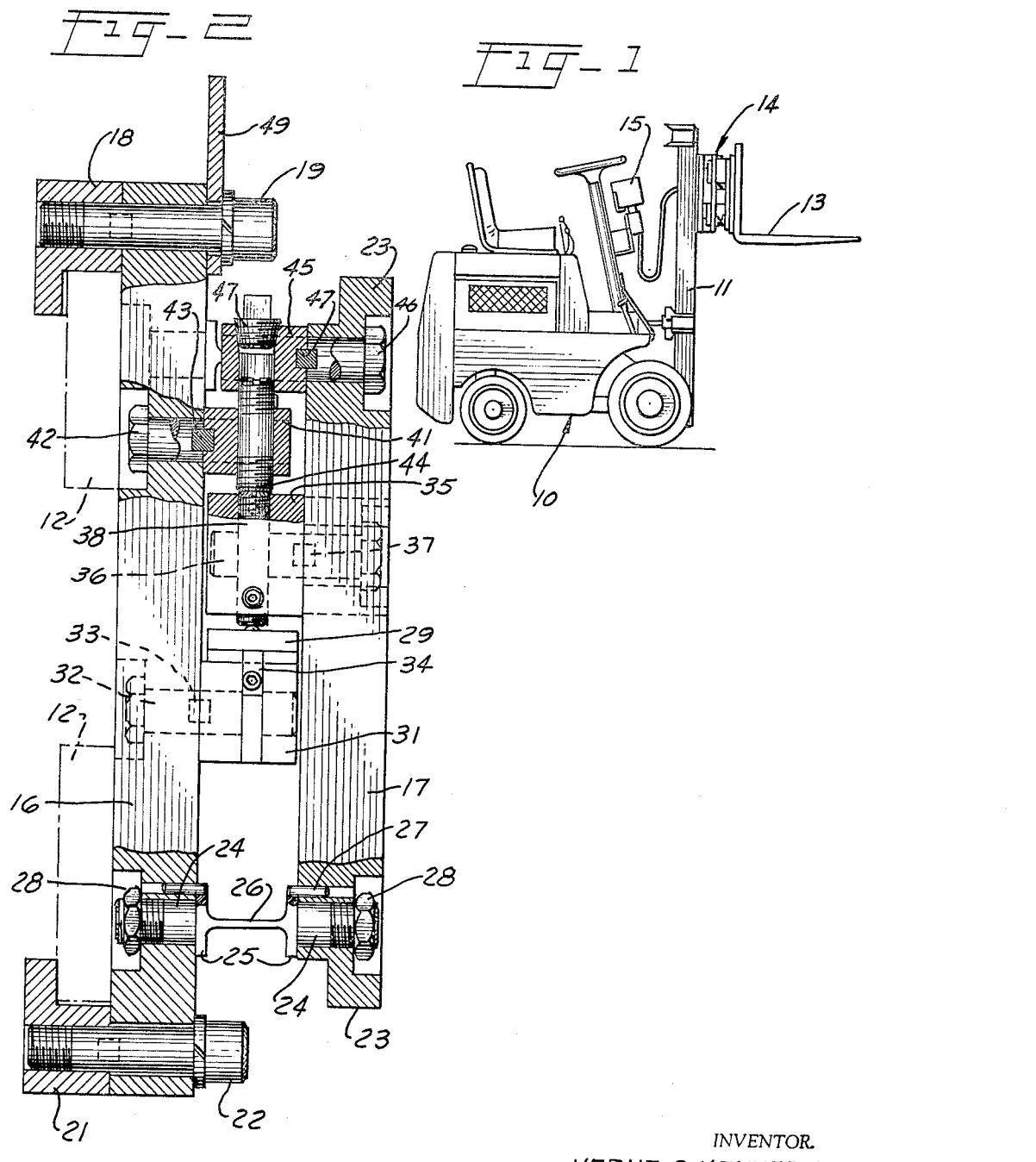
INVENTOR.
VERNE C. KENNEDY
BY
ATTORNEYS

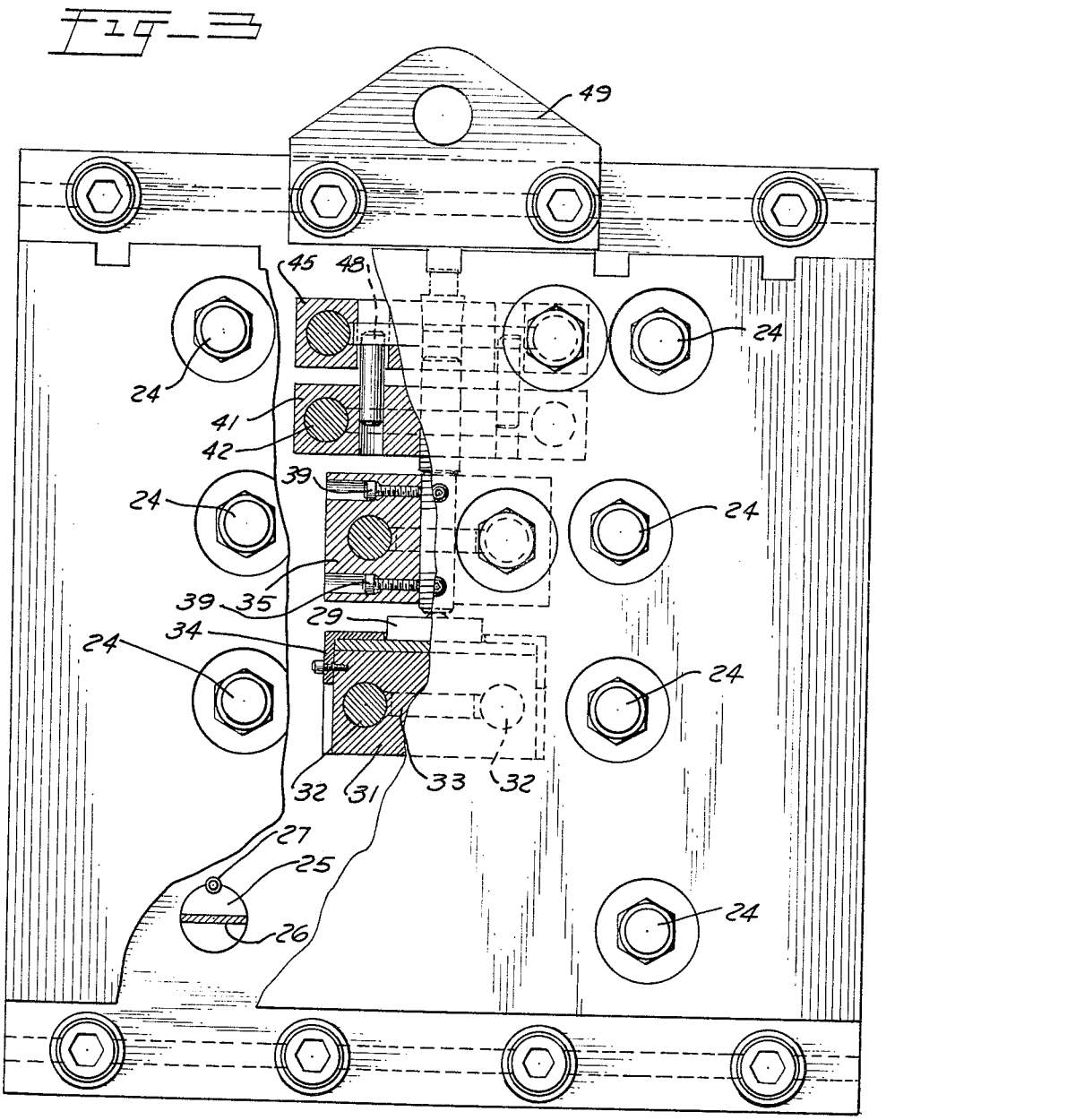

3,196,966
WEIGHING APPARATUS
Verne C. Kennedy, Bannockburn, Ill., assignor to Goodman Manufacturing Company, Chicago, Ill., a corporation of Illinois
Filed Jan. 13, 1964, Ser. No. 337,220
6 Claims. (Cl. 177—139)

This invention relates to weighing apparatus for fork lift trucks, and the like, and more particularly to an apparatus for weighing a load carried on the forks of a conventional lift truck regardless of the position of the load on the forks.

A large number of different types of apparatus have been proposed for weighing loads carried on the forks of a lift truck, but the problems encountered with apparatus of this type have not heretofore been satisfactorily solved. Such apparatus contemplates spaced vertical front and back plates with the front plate carrying the forks and the back plates secured to a mounting plate or mounting straps on a truck. Load measuring devices are connected between the plates to measure the downward force on the front plate produced by the load on the forks and the plates are connected by flexures which permit relative vertical movement while maintaining the plates in parallel relationship with each other. With this structure theoretically the only force acting on the load measuring device, such as a load cell, is the vertical force due to the load so that it will be measured accurately.

The principal difficulty heretofore encountered has been in connection with the construction and mounting of the flexure strips. For accurate repetitive operations, these strips must be accurately secured to the plates and must be extremely uniform for accurately balancing the plates so that they will have no tendency to tilt or cock relative to each other. The degree of accuracy required for the manufacturing and mounting of flexure strips of the type heretofore proposed has presented almost unsurmountable difficulties within the limitations imposed by weighing requirements and by acceptable manufacturing costs.

It is accordingly one of the objects of the present invention to provide a weighing apparatus in which the front and back plates are connected by a plurality of separate flexure elements, each of which has cylindrical end portions fitting into and secured to complementary openings in the plates and with flat horizontal intermediate portions forming flexure strips. These flexure elements are relatively easy to manufacture with a high degree of accuracy and can be rigidly secured to the plates in a simple manner.

Another object is to provide a weighing apparatus in which the flexure elements are rotatably mounted in the plates for rotary adjustment to change the angle of the flat horizontal portions thereof thereby to adjust the stiffness of the individual flexure elements. By this means, the flexure elements can be accurately balanced with each other for proper and accurate functioning.

According to a feature of the invention there are at least three and preferably four sets of flexure elements provided at vertically spaced points between the front and back plates with two of the sets of elements adjacent to and spaced respectively above and below the measuring device. This arrangement of the flexure elements reinforce and stiffens the front and back plates against bending under the applied load and assists in achieving accurate repetitive results.

The above and other objects and features of the invention will be more readily apparent from the following description when read in connection with the accompanying drawings in which:

FIG. 1 is a side elevation of a fork lift truck equipped with weighing apparatus embodying the invention;
FIG. 2 is a vertical section through the front and back assembly with parts in elevation; and
FIG. 3 is a front view of the assembly with parts broken away and in section.

The weighing apparatus of the invention is illustrated in FIG. 1 as applied to a conventional fork lift truck, indicated generally at 10, and which has the usual vertical mast 11 at its forward end. The mast is provided with mounting straps, as indicated at 12 in FIG. 2, for mounting of conventional forks 13 thereon. The weighing apparatus of the present invention, as indicated generally at 14, is interposed between the mounting straps and the forks to weigh the load carried by the forks. The load may be indicated or recorded in any suitable manner as by a recording device shown at 15 mounted adjacent to the position of the operator on the truck.

As best seen in FIG. 2, the weighing apparatus comprises a back plate 16 and a front plate 17 which are mounted in spaced parallel relation to each other. The back plate carries a mounting strip 18 which may be detachably secured thereto by bolts 19 and which fits over the upper mounting strap 12 on the truck. A similar mounting strip 21 secured by bolts 22 engages the lower mounting strap 12 to mount the back plate 16 securely on the truck. It will be understood that as so mounted the back plate may be moved vertically of the mast 11 by the usual truck lifting mechanism.

The front plate 17 is formed to receive conventional forks. To this end it terminates at its upper and lower edge in flange portions 23 which are of the same thickness and spacing as the upper and lower edges of the mounting strap 12. The forks 13 may therefore be mounted on this plate in the same manner as they are conventionally mounted on the straps 12 to project outward from the plate, as shown.

To connect the front and back plates for parallel vertical movement a plurality of flexure elements are provided, as best seen in FIG. 2. Each flexure element comprises an elongated member, preferably formed of high grade steel or similar material, with cylindrical ends 24 which may be threaded at their outer portions and which terminate in enlarged shoulders 25 at their inner portions. The cylindrical ends are connected by integral flat horizontal strip portions 26 which lie in horizontal planes between the front and back plates and which are relatively thin, as seen in FIGS. 2 and 3, to flex under relatively light loads. Preferably there are at least four flexure elements connecting the front and back plates, as shown in FIG. 3. According to one desirable feature of the invention, there are eight such flexure elements arranged in pairs at four different levels with one pair being adjacent to the bottom of the plates, the second being adjacent to the top of the plates and the other two pairs being vertically spaced in the central portions of the plates for a purpose to appear more fully hereinafter.

According to one feature of the invention, the flexure elements may be locked in position against undesired rotation by pins 27 fitting into complementary grooves in the flanges 25 and in the bores in the front and back plates. These pins will locate the flexure elements accurately so that the flattened central strip portions 26 thereof will be accurately positioned in horizontal planes. However, in the event the flexure elements are not precisely uniform due to minor variations in manufacture, the pins 27 for the weaker flexure elements can be removed and the cylindrical ends of these elements can be turned slightly in the openings provided therefor in the front and back plates. By turning the central flexible portion of an element out of the normal horizontal plane, the vertical stiffness of that element will be increased and can be brought into accurate balance with the remaining flexure elements. It is essential that the several flexure elements of a single unit be accurately balanced so that a load carried on the forks will not tend to cock the front plate to produce inaccurate results. This balancing can easily be effected with the construction of the invention in the manner described. Once the flexure elements are in the desired adjusted position they may be secured in place by nuts 28 threaded onto their ends and received in recesses provided for that purpose in the front and back plates.

For measuring the vertical load carried by the forks a measuring device, such as an electric strain gauge, is employed. As shown, a strain gauge 29 is supported between the plates on a supporting block 31 which is rigidly secured to the back plate 16 and projects forwardly therefrom. The block may be accurately and securely mounted by means of screws 32 threaded through the back plate and into the block to draw it securely against the back plate and to locate it accurately. For even more accurate location of the block a key element 33 may be provided between the bolts 32 fitting into complementary grooves in the faces of the back plate and the block. The load cell may be clamped to the upper surface of the block by clamping straps 34, as shown in FIGS. 2 and 3.

The front plate 17 carries an adjustable abutment to engage the load cell and to impose thereon a vertical load proportional to the load carried by the forks. For this purpose a block 35, similar to the block 31, is secured to the inner surface of the front plate by screws 36 and to a key 37. The block 35 is formed with a central vertical threaded opening therein to receive an abutment screw 38 which is positioned to register with a load receiving button on the load cell. By adjusting the abutment screw 38 vertically through the block the relative initial vertical positions of the front and back plates can be adjusted and the load cell can be preloaded to any desired degree. It has been found desirable, for example, to adjust the abutment screw 38 to a position which will flex the flexure strips upward slightly so that the load cell will be slightly preloaded. Once properly adjusted the abutment screw can be retained in adjusted position by lock screws 39.

Relative vertical and horizontal movement of the front and back plates is limited to avoid damage to the flexure strips and to the load cell. For this purpose a third block 41 is secured to the back plate by screws 42 and a key 43 in the same manner as the blocks 31 and 35 are secured to the front and back plates respectively. The block 41 is provided with a central threaded bore therein in which a stop screw 44 is threaded in vertical alignment with the abutment screw 38. This stop screw is normally adjusted to provide the desired vertical clearance with the upper end of the abutment screw 38 to limit downward movement of the front plate relative to the back plate under excessive loads. By properly adjusting the stop screw sufficient movement may be permitted to weigh any load within the desired range while still protecting the apparatus against excessive loads. For limiting horizontal movement, a fourth block 45 is provided secured to the front plate 17 by screws 46 and a key 47 in the same manner in which the previous blocks were mounted. The block 45 is provided with a central vertical opening loosely to receive the upper end of the abutment screw 44 and through which a screwdriver, or the like, may be inserted to adjust the abutment screw. The upper end of this opening is preferably closed by a plug 47 to keep dirt and foreign material out of the opening which might interfere with relative movement of the plates.

In addition, as best seen in FIG. 3, the block 41 carries a pair of vertically extending pins 48 which are rigidly secured to the block 41 and whose upper ends extend loosely into the registering openings in the block 45. By regulating the clearance between the pins 48 and the openings in the block 45, the amount of relative horizontal movement between the front and back plates can be limited without interfering with proper functioning of the apparatus.

It will be noted from FIG. 3 that the two vertically central pairs of flexure elements 24 are located in horizontal planes adjacent to and respectively above and below the load cell 29. These flexure elements serve to reinforce the front and back plates against bending under bending moments imposed thereon by a load on the forks. It will be seen that such a load tends to bow the front plate and by the provision of the flexure strips closely adjacent to the central portion of the plate it is reinforced so that it can withstand the bending loads imposed upon it by the forks without requiring that it be made of the thickness and strength which would otherwise be necessary.

Preferably in using the weighing device of the invention on a fork lift truck a separate weighing unit is provided for each of the forks although the two forks could be mounted on a single weighing unit if desired. For handling the units plates 49 are secured to the upper edge of the back plate 16 by the mounting bolts 19 and are formed with openings therein to receive a hook on the hoist or the like. This facilitates moving and mounting of the weighing apparatus.

With the apparatus installed on a truck it provides an extremely rugged assembly capable of withstanding rough usage to which such trucks are customarily subjected and at the same time provides accurate repetitive results.

While one embodiment of the invention has been shown and described herein, it will be understood that it is illustrative only and not to be taken as a definition of the scope of the invention, reference being had for this purpose to the appended claims.

What is claimed is:

1. Weighing apparatus for use on a fork lift truck or the like comprising horizontally spaced vertical back and front plates, means on the back plate for mounting it on a support, a horizontal elongated load receiving member connected to the front plate to receive a load to be weighed, a plurality of vertically spaced flexure elements connecting the plates, and means separate from the flexure elements connecting the plates to measure the vertical force therebetween, each of the flexure elements comprising an elongated unitary member having cylindrical ends fitting into and rigidly secured in complementary openings in the plates respectively and the central part of the member being in the form of a horizontally extending flat strip which is adapted to flex to accommodate relative vertical movement of the plates.

2. Weighing apparatus for use on a fork lift truck or the like comprising horizontally spaced vertical back and front plates, means on the back plate for mounting it on a support, a horizontally elongated load receiving member connected to the front plate to receive a load to be weighed, a plurality of vertically spaced flexure elements connecting the plates, and means separate from the flexure elements connecting the plates to measure the vertical force therebetween, each of the flexure elements comprising an elongated unitary member having cylindrical ends fitting into complementary openings in the plates respectively, shoulders on the ends adjacent to the central portion of the member engageable with the inner faces of the respective plates, fastenings on the ends engaging the outer faces of the plates to secure the member thereto, the central part of the member being in the form of a horizontal flat strip which will flex to accommodate relative vertical movement of the plates.

3. The weighing apparatus of claim 1 including means connecting the plates to limit separation thereof in the event of breakage of a flexure element.

4. The weighing apparatus of claim 1 in which the measuring means comprises a first block secured to the back plate, a load cell supported on the first block, a second block secured to the front plate and engaging the load cell, and a third block secured to the back plate and overlying the second block to limit upward movement of the front plate relative to the back plate.

5. The weighing apparatus of claim 1 in which the ends of the flexure elements are rotatably adjustable in said complementary openings whereby the vertical stiffness of the flexure elements can be individually adjusted.

6. The weighing apparatus of claim 1 in which there are flexure elements adjacent to the upper and lower edges of the plates and additional flexure elements extending between the front and back plates closely adjacent to the measuring means and respectively above and below the measuring means.

References Cited by the Examiner

UNITED STATES PATENTS 2,822,095  2/58  Buckingham _____ 177—139 X

FOREIGN PATENTS 649,220  9/62  Canada.
1,056,391  4/59  Germany.

LEO SMILOW, *Primary Examiner.*